US009550700B2

(12) United States Patent
Malanga et al.

(10) Patent No.: US 9,550,700 B2
(45) Date of Patent: Jan. 24, 2017

(54) POROUS MULLITE BODIES HAVING IMPROVED THERMAL STABILITY

(71) Applicant: Dow Global Technologies LLC, Midland, MI (US)

(72) Inventors: Michael T. Malanga, Midland, MI (US); James J. O'Brien, Midland, MI (US); Aleksander J. Pyzik, Midland, MI (US); Nicholas M. Shinkel, Midland, MI (US); Clifford S. Todd, Midland, MI (US); Paul C. Vosejpka, Midland, MI (US); Robin P. Ziebarth, Midland, MI (US)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 0 days.

(21) Appl. No.: 14/437,580

(22) PCT Filed: Mar. 7, 2013

(86) PCT No.: PCT/US2013/029585
§ 371 (c)(1),
(2) Date: Apr. 22, 2015

(87) PCT Pub. No.: WO2014/088618
PCT Pub. Date: Jun. 12, 2014

(65) Prior Publication Data
US 2015/0299045 A1 Oct. 22, 2015

Related U.S. Application Data

(60) Provisional application No. 61/733,541, filed on Dec. 5, 2012.

(51) Int. Cl.
| | | |
|---|---|---|
| C04B 35/00 | (2006.01) |
| C04B 35/52 | (2006.01) |
| C04B 35/56 | (2006.01) |
| C04B 35/185 | (2006.01) |
| C04B 35/565 | (2006.01) |
| C04B 35/584 | (2006.01) |
| C04B 38/00 | (2006.01) |
| C04B 111/00 | (2006.01) |

(52) U.S. Cl.
CPC ........... *C04B 35/185* (2013.01); *C04B 35/565* (2013.01); *C04B 35/584* (2013.01); *C04B 38/00* (2013.01); *C04B 2111/00793* (2013.01); *C04B 2235/322* (2013.01); *C04B 2235/3206* (2013.01); *C04B 2235/3208* (2013.01); *C04B 2235/3217* (2013.01); *C04B 2235/3224* (2013.01); *C04B 2235/3225* (2013.01); *C04B 2235/3272* (2013.01); *C04B 2235/349* (2013.01); *C04B 2235/442* (2013.01); *C04B 2235/443* (2013.01); *C04B 2235/449* (2013.01); *C04B 2235/46* (2013.01); *C04B 2235/6565* (2013.01); *C04B 2235/6587* (2013.01); *C04B 2235/661* (2013.01); *C04B 2235/72* (2013.01); *C04B 2235/85* (2013.01); *C04B 2235/96* (2013.01)

(58) Field of Classification Search
CPC ..... C04B 35/565; C04B 35/584; C04B 35/185
USPC .......................................... 501/88, 97.1, 128
See application file for complete search history.

(56) References Cited

U.S. PATENT DOCUMENTS

| | | | |
|---|---|---|---|
| 3,359,211 A | | 12/1967 | Jaffe |
| 3,503,894 A | | 3/1970 | Wachtel |
| 4,384,909 A | | 5/1983 | Layden |
| 4,434,238 A | | 2/1984 | Ezis et al. |
| 4,910,172 A | | 3/1990 | Talmy et al. |
| 4,911,902 A | | 3/1990 | Talmy et al. |
| 4,948,766 A | | 8/1990 | Talmy et al. |
| 5,098,455 A | | 3/1992 | Doty et al. |
| 5,173,349 A | | 12/1992 | Yavuz et al. |
| 5,194,154 A | | 3/1993 | Moyer et al. |
| 5,198,007 A | | 3/1993 | Moyer et al. |
| 5,252,272 A | | 10/1993 | Yavuz et al. |
| 6,238,618 B1 * | | 5/2001 | Brundage ............. C04B 35/185 264/638 |
| 6,596,665 B2 | | 7/2003 | Wallin et al. |
| 7,425,297 B2 | | 9/2008 | Saha et al. |

(Continued)

FOREIGN PATENT DOCUMENTS

| | | |
|---|---|---|
| EP | 0277753 A2 | 8/1988 |
| EP | 0397464 A1 | 11/1990 |

(Continued)

OTHER PUBLICATIONS

Kong, L., et al., Mullite phase Formation in Oxide Mixtures in the Presence of Y2O3, LA2O3 and CeO2, Journal of Alloys and Compounds, 372, pp. 290-299, 2004, Temasek Laboratories, National University of Singapore, 10 Kent Ridge Crescent, Singapore 119260, Singapore and School of Materials Engineering, Nanyang Technological University, Nanyang Avenue, Singapore 639798, Singapore, Elsevier B.V.
Reed, J., Introduction to the Principles of Ceramic Processing, Wiley Interscience, 1988, Chapters 20 and 21, Part 1, pp. 329-372 and Part 2, pp. 373-379.
Kutty, T.R.N., et al., "Photoluminescence of Eu2+-doped mullite (xAl2O3.ySiO2; x/y=3/2 and 2/1) prepared by a hydrothermal method", Materials Chemistry and Physics, vol. 65, No. 2, Jan. 28, 2000, pp. 158-165, XP002696079, Materials Research Centre, Indian Institute of Science, Bangalore 560 012, India, Elsevier Science S.A.

(Continued)

*Primary Examiner* — Noah Wiese
(74) *Attorney, Agent, or Firm* — The Dobrusin Law Firm, P.C.

(57) ABSTRACT

A porous ceramic composition having improved thermal stability is comprised of ceramic grains bonded together by grain boundary phase comprised of silica, yttrium and oxygen wherein the amount of alkali metals, alkaline earth metals and other transition metals not including rare earth metals is at most 2% by weight of the grain boundary phase.

21 Claims, No Drawings

(56) References Cited

U.S. PATENT DOCUMENTS

| | | | |
|---|---|---|---|
| 7,485,594 B2* | 2/2009 | Saha | B01D 39/2093 |
| | | | 264/629 |
| 7,528,087 B2 | 5/2009 | Saha et al. | |
| 2007/0213207 A1 | 9/2007 | Saha et al. | |
| 2010/0052502 A1 | 3/2010 | Ota | |
| 2015/0284294 A1 | 10/2015 | Malanga et al. | |

FOREIGN PATENT DOCUMENTS

| | | |
|---|---|---|
| WO | 8000079 A1 | 1/1980 |
| WO | 9211219 A1 | 7/1992 |
| WO | 0040521 A1 | 7/2000 |

OTHER PUBLICATIONS

Park, Joung Kyu, et al., "Effect of composition on luminescence properties of Eu2+-activated mullite", Journal of the Electrochemical Society, vol. 150, No. 10, Jan. 1, 2003, pp. H246-H249, XP002696080, "Experimental", "Conclusions", figures 4, 5, 6, Korea Research Institute of Chemical Technology Advanced Materials Division, Tacjon 105-600, Korea and Department of Ceramic Engineering, Yonsei University, Seoul 120-749, Korea.

De Arellano-Lopez, A., et al., "Compressive creep of mullite containing Y2O3", Acta Materialia 50, 2002, pp. 4325-4338, Jan. 10, 2002, Depto de Fisica de la Materia Condensada, Universidad de Sevilla, PO. Box 1065, 41080 Sevilla, Spain and Energy Technology Division, Argonne National Laboratory, Argonne, IL 60439-4838, USA, Acta Materialia Inc.

Wu, L., et al., "Dependence of glass-forming ability on starting compositions in Y2O3-Al2O3-SIO2 system", Ceramics-Silikaty 55, 3, pp. 228-231, 2011, XP002695958, Technical Institute of Physics and Chemistry, Chinese Academy of Sciences, Beijing 100190, China.

Huang, Zhen-Kun, et al., "Solid-Liquid reaction in the system Si3N4-Y3Al5O12-Y2Si2O7 under 1 MPa of nitrogen", J. Am. Ceram. Soc., 77, 10, 1994, pp. 2753-2766, Jan. 1, 1994 XP002695959, Department of Materials Science and Engineering, The University of Michigan, Ann Arbor, Michigan 48109.

Hae-Won, Kim., et al., "Oxidation behavior and effect of oxidation on strength of Si3N4/Sic nanocomposites", J. Mater. Res., vol. 15, No. 7, Jul. 2000, pp. 1478-1482, Jan. 1, 2000, XP-002695960, School of Materials Science and Engineering, Seoul National University, Seoul, 151-742 Korea, Materials Research Society.

Zhanglian H., et al., "High temperature creep strength of Si3N4-Y2Si2O7 ceramics by stress relaxation based on a new interpretation model", Key Engineering Materials, vol. 336-38, 2007, pp. 1420-1423, Jan. 1, 2007, Department of materials Science and Engineering, Zhejiang University, Hangzhou 310027, China and National Institute for Materials Science, 1-2-1 Tsukuba Sengen, Ibaraki 305-0047, Japan and Kochi University of Technology, Tosayamada, Kochi 782-8502, Japan.

She, J., et al., "Mullitization and densification of Y2O3-doped reaction-bonded mullite ceramics and different compositions", Materials Chemistry and Physics, 76, 2002, pp. 88-91, Jan. 1, 2002, Synergy Materials Research Center, national Institute of Advanced Industrial Science and Technology, 2268-1 Anagahora, Shimo-Shidami, Moriyama-ku, Nagoya 463-8687, Japan and Institute of Materials Research, German Aerospace Center (DLR), 51147 Kolm, Germany, Elsevier Science B.V.

Govila, R., "Strength characterization of yttria-doped sintered silicon nitride", Journal of Materials Science, 20, 1985, pp. 4345-4353, Jan. 1, 1985, Ceramic Materials Department, Ford Motor Company, P.O. Box 2053, Dearborn, Michigan 48121, USA, Chapman and Hall Ltd.

Shelby, J., et al., "Formation and properties of yttrium aluminosilicate glasses", Glass Science Laboratory, New York State College of Ceramics, Alfred University, Alfred, NY 14802, USA, Physics and Chemistry of Glasses, vol. 33, No. 3, Jun. 1992, pp. 93-98.

Becerro, A., et al., "Hydrothermal Chemistry of Silicates: Low-Temperature Synthesis of γ-yttrium disilicate", Departamento de Quimica Inorganica, Instituto de Ciencia de Materiales de Sevilla, Universidad de Sevilla-CSIC, 41092, Sevilla, Spain, J. Am. Ceram. Soc., 86 [9], pp. 1592-1594, 2003.

She, J., et al., "Reaction-bonding behavior of mullite ceramics with Y2O3 addition", Journal of the European Ceramic Society, 22, 2002, pp. 323-328, Elsevier Science Ltd., Institute of Materials Research, German Aerospace Center, (DLR), 51147 Koln, Germany.

Kolitsch, U., et al., "Phase equilibria and crystal chemistry in the Y2O3—Al2O3—SiO2 system", J. Mater. Res., vol. 14, No. 2, Feb. 1999, materials Research Society, pp. 447-455, Max-Planck-Institut fur Metallforschung, and Universitat Stuttart, Institut fur, Nichmetallische Anorganische Materialien, Pulvermetallurgisches Laboratorium, Heisenbergstr. 5, D-70569 Stuttgart, Germany.

Lin, Yung-Jen, et al., "Joining of mullite ceramics with yttrium aluminosilicate glass interlayers", Ceramics International 35, 2009, pp. 1311-1315, Department of Materials Engineering, Tatung University, No. 40, Section 3, Chungsan North Road, Taipei 10451, Taiwan, Elsevier Ltd. and Techna Group S.r.l.

Sun, Z., et al., J. Am. Ceram. Soc, 91, [8], pp. 2623-2629, 2008, The American Ceramic Society, Thermal properties and thermal shock resistance of γ-Y2Si2O7, Shenyang National Laboratory for Materials Science, Institute of Metal Research, Chinese Acadamy of Sciences, Shanyang 110016, China and Graduate School of Chinese Academy of Sciences, Beijing 100039, China.

Kong, L., et al., Journal of Alloys and Compounds, 372, 2004, pp. 290-299, Mullite phase formation in oxide mixtures in the presence of Y2O3, La2O3 and CeO2, Elsevier B.V., Temasek Laboratories, National University of Singapore, 10 Kent Ridge Crescent, Singapore 119260, Singapore and School of Materials Engineering, Nanyang Technological University, Nanyang Avenue, Singapore 639798, Singapore.

IPRP and Written Opinion for Application No. PCT/US2013/029585, dated Jun. 9, 2015.

Office Action, for copending U.S. Appl. No. 14/437,578 dated Nov. 5, 2015.

Copending Patent Application, U.S. Appl. No. 14/437,578, filed Apr. 22, 2015, published as 2015/0284294.

International Search Report for Application No. PCT/US2013/029585, dated Jun. 18, 2013.

* cited by examiner

POROUS MULLITE BODIES HAVING IMPROVED THERMAL STABILITY

FIELD OF THE INVENTION

The invention relates to mullite bodies and methods of forming mullite bodies. In particular, the invention relates to mullite bodies having fused interlocked acicular grains displaying improved thermal stability under particular elevated temperature environments.

BACKGROUND OF THE INVENTION

Recently, more stringent regulations of particulate matter emitted by diesel engines have been passed in Europe and the United States. To meet these regulations, it is expected that particulate filters will be necessary.

These particulate filters need to meet multiple contradictory exacting requirements. For example, the filter must have sufficient porosity (generally greater than 55 percent porosity) while still retaining most of the emitted micrometer sized diesel particulates (generally greater than 90 percent capture of the emitted particulates). The filter must also be permeable enough so that back pressure is relatively low while the filter is in the clean state and also remains low while accumulating an amount of soot before being regenerated.

The filter must withstand the corrosive exhaust environment for long periods of time. The filter must have an initial strength to be compression fitted into a container attached to the exhaust system. The filter must be able to withstand thermal cycling (i.e., retain adequate strength) from the burning off of the soot entrapped in the filter (regeneration) over thousands of cycles where local temperatures may reach as high as 1600° C. and typically reach between 600 to 1000° C. under typical regeneration cycles.

The filter must, for long periods of time, withstand the corrosive exhaust environment containing water, nitrous oxide, carbon monoxide, carbon dioxide and hydrocarbons at elevated temperature. In addition, the filter must be stable to not only gaseous environment, but materials that are in contact with the filter such as catalyst and catalyst supports (washcoat particulates such as high surface area alumina) and ash from the exhaust such as alkali and alkaline earth oxides and other metal oxides, phosphates, and sulfates.

Porous ceramic filters generally are made from extrusions of ceramic particulates when heated bond together to form a porous ceramic body made up of many individual ceramic grains ceramically bonded together via a disordered/glassy grain boundary phase, ordered/crystalline grain boundary phase, or a combination thereof of differing composition than the individual ceramic grains. For example, cordierite in many instances has a glassy grain boundary phase. Mullite filters as well often have such glassy grain boundary phases such as those having interlaced crystals grown together have been used and are described by U.S. Pat. Nos. 5,098,455; 6,596,665; 7,528,087; and 7,425,297; and WO 92/11219. Silicon carbide, likewise often has a glassy grain boundary phase or silicon binding phase depending on the process used to sinter the grains together.

Accordingly, it would be desirable to provide both a formation method and a ceramic composition that meets or improves one or more of the aforementioned and in particular improves the thermal stability of such a composition.

SUMMARY OF THE INVENTION

We have discovered that certain washcoat particulates such as those containing alumina or ash may cause weakening of the grain boundary phase of ceramic filters over long periods of time when exposed to elevated temperatures and atmospheres encountered in internal combustion exhaust streams (e.g., gasoline and diesel engines). We have now discovered a porous ceramic filter that solves this previously unknown problem.

A first aspect of the present invention is a porous ceramic composition comprising ceramic grains bonded together by a grain boundary phase comprised of silicon, yttrium and oxygen, wherein the amount of alkali metals, alkaline earth metals and other transition metals not including rare earth metals is at most 2% by weight of the grain boundary phase. Since the operating conditions experienced by engine particulate filters are complex due to varying environments, temperature and exposure to catalysts used to treat the exhaust and ever larger amounts of ash over time, it is not understood why the present composition realizes improved thermo-mechanical stability over time. It is believed, however, but in no way limiting the invention, that the yttrium somehow protectively locks up the grain boundary phase when initially formed and protects it from attack (e.g., etching, phase separation, cracking and the like) from other particulates that come in contact with grains such as alumina wash coat particulates or ash particulates. Ash particulates (e.g., metal oxides phosphates and the like) are residue of the soot after it, the soot (e.g., carbonaceous matter), has been removed (e.g., oxidized) during regeneration of the filter.

A second aspect of the invention is a porous ceramic composition comprised of ceramic grains bonded together by a grain boundary phase comprised of silicon, yttrium, and oxygen wherein the porous ceramic filter retains at least 80% of its strength after being heated to 860° C. and held for 100 hours under flowing air containing 10% by volume of water wherein at least a portion of the grain boundary phase is in contact with gamma alumina particles.

A third aspect of the invention is a method for preparing a porous mullite composition, the method comprising, a) forming a mixture of one or more precursor compounds having yttrium and the elements present in mullite, wherein alkali metals, alkaline earth metals and other transition metals not including rare earth metals are present in an amount such that the porous mullite composition that is formed has a grain boundary phase comprised of yttrium having at most about 2% by weight of said metals, b) shaping the mixture into a porous green shape, c) heating the porous green shape of step (b) to a temperature for a time under an atmosphere such that the porous mullite composition is formed, wherein said composition has a porosity from 40% to 85% and ceramic particulates are bonded together by said ceramic grain boundary phase comprising yttrium.

Surprisingly, the presence of the yttrium in the grain boundary phase in combination with the absence of any substantial amount of the other metals described above results in a porous acicular mullite structure that has a thermal shock factor and strength that is retained compared to a mullite composition made without yttrium or made with yttrium in combination with the aforementioned metals other than rare earth metals.

The porous ceramic composition of the present invention may be used in any application taking advantage of a porous ceramic. Examples include filters, refractories, thermal and electrical insulators, reinforcement for composite bodies of metals or plastics, catalysts and catalyst supports.

DETAILED DESCRIPTION OF THE INVENTION

Ceramic Composition

The porous ceramic composition is comprised of ceramic grains. The ceramic grains may be any useful ceramic that does not contain an alkali metal, alkaline earth metal or other transition metal excluding yttrium, wherein the aforementioned transition metal does not encompass a rare earth metal. Exemplary ceramics include alumino silicates (e.g., mullite), carbides, nitrides, carbonitrides, silicates, and aluminates. The ceramic grains desirably are mullite, silicon carbide or silicon nitride.

The porous ceramic composition has any porosity such that it is suitable for the applications described above. Typically, the composition is 40% to 85% porous. Generally, the porosity is at least 45%, 50%, 60% or 65% to at most about 85% or 80%.

The ceramic grains also desirably have an aspect ratio of greater than about 2 (e.g., length twice as great as width), which are referred to herein as "acicular" grains. Desirably, the acicular grains are mullite or silicon carbide and in particular mullite. Further the ceramic grains may have an average aspect ratio of at least about 2. Preferably, the average aspect ratio is at least about 5 to preferably at most about 50.

The microstructure may be determined by suitable techniques such as microscopy on a polished section. For example, the average grain size may be determined from a scanning electron micrograph (SEM) of a polished section of the body, wherein the average grain size may be determined by any suitable or known method such as the intercept method described by Underwood in *Quantitative Stereology*, Addison Wesley, Reading, Mass., (1970).

The ceramic grains are bonded together via a grain boundary phase. The grain boundary phase is comprised of silicon, yttrium and oxygen. The grain boundary phase may contain other elements such as nitrogen and carbon, group 13 and 14 elements, nitrogen and rare earth elements.

If the grain boundary contains a rare earth element (rare earth elements means those elements that make up the Lanthanide and Actinide series in the periodic table), the amount of the rare earth element is typically less than 25% by mole of the grain boundary phase and desirably is less than 20%, 15%, 10%, 5% or 0% by mole of the glassy grain boundary phase.

If a rare earth element is present, it is desirably europium, gadolinium, neodymium or mixture thereof. The grain boundary may also contain a group 13 or 14 element. Generally, the group 13 element may be B, Al, Ga or mixture thereof and the Group 14 element other than silicon may be C, Ge, Sn or mixture thereof. Typically, the group 13 element is Al. Typically, the group 14 element is C or Ge. In addition, nitrogen may also be present in the grain boundary phase.

The amount of group 13 element such as Al, may be present in an amount of less than 25%, 10%, 5% by mole or even no group 13 element. The amount of group 14 element other than Si such as C, may be present in an amount by mole of less than 25%, 10%, 5% or even no group 14 element. The amount of nitrogen may be present in an amount by mole of less than 25%, 10%, 5% or even no nitrogen.

Generally, the grain boundary phase is an amorphous phase (i.e., disordered phase) of Si, O, Y and quite often a group 13 element such as aluminum as described above. Amorphous means that there is no ordered molecular or atomic structure that is detectable using typical analytical techniques. That is, there may be some very small ordered structure, but due to the size of such order, the techniques to measure such order, for example, fail to detect or is not substantially different than an amorphous material. For example, the ordered domains may be of such a small size that X-ray diffraction or electron diffraction results in such diffuse scattering that if such domains were present they would be of a size of at most about 50 nanometers.

In a particular embodiment, the grain boundary phase may also contain crystalline phases and in particular yttrium silicate crystalline phases such as $Y_2Si_2O_7$ and $Y_2SiO_5$. The grain boundary phase may have any amount of such crystalline phases that may be useful including all of the grain boundary phase being crystalline. In this embodiment is desirable for the amount of crystalline phase to be at least about 25%, 50%, 75%, 85%, 90% or 95% by volume of the grain boundary phase with the remainder being amorphous.

It has been discovered, when the yttrium crystalline phases are present in the grain boundary phase in sufficient amounts, which is generally greater than 80% by volume, the strength retained after being exposed to heated moist air in the presence of alumina as described herein surprisingly may be greater than 90% or even 95% of the strength prior to such exposure.

It is critical for the grain boundary phase to be free, as much as possible, of alkali metals, alkaline earth metals and transition metals. The total amount of these needs to be at most 2% by weight of the grain boundary phase. Generally, the total amount of these metals is at most 1.5%, 1%, 0.75%, 0.5%, 0.25%, 0.1% or below the detection limit of analytical techniques useful for measuring elemental composition (i.e., essentially zero) of grain boundary phase such as those known in the electron microscopy art for determining chemical composition including, for example, electron diffusivity spectroscopy (EDS).

Particularly deleterious metals include iron and magnesium. Even though the total amount of metal described above, it is desirable that Mg and Fe are at most 0.1% by weight of the grain boundary phase.

Generally, the amount of the grain boundary phase is at least 1% to less than 15% by volume of the porous ceramic composition.

It has been observed that a ceramic composition having a grain boundary phase comprised of Y, Si and O that is free from the particular metals as described above forms a composition and in particular a porous acicular mullite composition that has improved strength retention after being exposed to ash and/or catalyst wash coats comprised of alumina at elevated temperatures in atmospheres containing water such as those encountered in an internal combustion engine's exhaust.

In a particular embodiment, the porous ceramic composition retains at least 80% of its strength after being heated to 860° C. and held for 100 hours under an atmosphere of humid air, wherein at least a portion of the grain boundary phase is in contact with gamma alumina particulates and the amount of water is 10 volume % or more. The amount of gamma alumina that is present on the porous ceramic composition is an amount sufficient to be in contact with at least 5% of the surface area of the porous ceramic composition. The gamma alumina may be deposited by any suitable means such as painting, dip coated, insipient wetness techniques, positive and negative pressure powder coating means, aerosolization, or other known techniques for depositing catalysts on porous ceramic substrates.

Generally, the ceramic, when used as internal combustion engine particulate trap should have a strength (herein modulus of rupture "MOR" as measured using a 4 point bend measurement) that is adequate to survive in such an environment. Generally, the MOR is at least about 5 MPa. Preferably, the MOR is at least about 10 MPa, more preferably the MOR is at least about 15 MPa, even more preferably at least about 20 MPa and most preferably at least about 35 MPa. The MOR is determined by 4 point bending of a bar cut from a ceramic honeycomb. The strength measurement may be made using a known technique such as described by ASTM C1161.

In addition, the ceramic composition desirably has a permeability coefficient that is as high as possible to reduce back pressure buildup, while still retaining sufficient particles. The permeability coefficient is proportional, for example, to the total amount of porosity and size of the pores and inversely proportional to tortuosity of the interconnected porosity. Generally, the permeability coefficient should be at least $1\times10^{-13}$ m$^2$ as determined using Darcy's equation. Preferably, the permeability coefficient is at least about $2\times10^{-13}$ m$^2$.

Surprisingly, the porous ceramic composition and in particular an acicular mullite porous ceramic composition has improved retention of strength (modulus of rupture) and thermal shock factor compared to a mullite composition failing to have yttrium in combination with the absence of the above described metals. Generally, the thermal shock factor is at least about 200° C. after being exposed to humid air and alumina or ash at elevated temperatures as described above. The thermal shock factor (TSF) is given by the following equation:

$$TSF = \frac{\text{Strength}}{(\text{Modulus})(CTE)}$$

where CTE is the coefficient of thermal expansion given in (1/° C.). Mullite's CTE is about $5.3\times10^{-6}$ per ° C. over the range of room temperature to 800° C.

Even though the theoretical Al/Si mullite stoichiometry is 3 (3Al$_2$O$_3$.2 SiO$_2$), the bulk Al/Si stoichiometry of the mullite composition may be any suitable stoichiometry, such as 4.5 Al/Si to 2 Al/Si. Bulk stoichiometry means the ratio of Al to Si in the body (i.e., not each individual grain). It has surprisingly been discovered, however, that further improvements to retained strength occur when the bulk stoichiometry of the body is greater than 3 to 4.5, which correlates to an alumina (Al$_2$O$_3$) to silica (SiO$_2$) stoichiometry of greater than 1.75.

It has been discovered that it is generally desirable for the Al/Si bulk stoichiometry to be at least 3.3 to at most about 4.2. In particular, the aforementioned ratios are particularly useful when forming the above described embodiment where at least some portion of the grain boundary phase is crystalline. The ratios generally are desirably greater than 3 to at most about 3.3 when the grain boundary phase is amorphous.

In a preferred embodiment, the amorphous grain boundary phase is of a uniform chemical composition. Uniform in this context means that there is not two or more distinct phase separated glass or crystalline regions within a majority of the amorphous grain boundary regions lying between grain intersections ("fillets"). Preferably, at least 75%, 80%, 85%, 90%, 95%, 99% or even essentially all of the fillets have a uniform amorphous phase. When determining the uniformity, an appropriate statistical amount of randomly selected fillets (e.g., 25 to 100) within a body are selected and examined via back scattered scanning electron microscopy to determine whether the fillet is homogeneous or separated into two or more glass regions having different chemical composition. Different chemical composition is when the yttrium present in the glass varies across the fillet by more than 10% when analyzed across the fillet.

The bulk stoichiometry may be measured by any suitable techniques, such as those known in the art, including, for example, X-ray fluorescence Forming the Ceramic Composition In making the ceramic composition, precursor compounds for the particular ceramic composition are mixed to form a mixture. Illustratively, when making mullite and in particular acicular mullite, precursor materials containing aluminum, silicon, yttrium and oxygen are mixed to form a mixture. Precursor compounds that may be used, so long as they are sufficiently pure to realize the porous ceramic composition of the invention, are described in U.S. Pat. Nos. 5,194,154; 5,198,007; 5,173,349; 4,911,902; 5,252,272; 4,948,766 and 4,910,172, each incorporated herein by reference.

Generally, the mixture maybe comprised of synthetic or high purity clay (i.e., hydrated aluminum silicate) alumina, silica, aluminum trifluoride, fluorotopaz. Preferably, the precursor compounds are silica (amorphous or crystalline such as quartz) and alumina and mixtures thereof.

Generally, the mixture contains a total amount of alkali metals, alkaline earth metals and other transition metals not including rare earth metals in an amount such that the grain boundary phase will have less than the aforementioned 2% by weight in the grain boundary phase. Generally this means the total amount of these metals in the mixture should be at most about 0.5%, 0.25%, 0.1%, 0.01% or essentially 0% of the mixture (i.e., below the detection limit of analytical techniques useful for measuring bulk elemental chemistry such as those known in the art, including for example, X-ray fluorescence and inductively coupled plasma atomic emission spectroscopy).

The mixture may also contain organic compounds to facilitate the shaping of the mixture (e.g., binders and dispersants, such as those described in *Introduction to the Principles of Ceramic Processing*, J. Reed, Wiley Interscience, 1988). It is understood that compounds such as organic additives or porogens (e.g., graphite) are not included in determining the amount of the undesirable metals described in the previous paragraph. In other words, such compounds do not contribute to such metals in the final composition. If however, these compounds do result in such residual metals upon removal, these are taken into account.

Any compound containing yttrium may be used so long as it forms the oxide grain boundary phase of the porous ceramic composition. The compound may be an oxide or one that forms an oxide when the mixture is heated to form the ceramic composition such as described below in this paragraph. Similarly, if a rare earth is desired, a compound that contains a rare earth element may be in the form of an oxide or compound that forms an oxide grain boundary phase upon heating to form the composition. Exemplary compounds include an oxide, an inorganic metal salt (e.g., chloride, fluoride, nitrate, chlorate, carbonate) or an organic metal compound such as an acetate. Preferably the compound is an oxide, nitrate, acetate, carbonate or combination thereof. Most preferably the compound is an oxide.

The precursor compounds may be selected in proportions so that the resultant mullite has an Al/Si stoichiometry from about 2 to about 4.5, as described previously. Preferably, the precursors are selected so that the mullite body has an Al/Si bulk stoichiometry of at least about 3 to 4.25 also described previously. It is understood herein that the Al/Si stoichiometry refers to the aluminum and silicon in the precursor ceramic. That is to say, if the fluorine source, for example, is $AlF_3$, the amount of $SiO_2$ present in the precursors for stoichiometry purposes may be reduced by an amount of $SiF_4$ that is volatilized off by the reaction of the fluorine from the $AlF_3$ with the $SiO_2$ to form $SiF_4$.

The amount of the yttrium compound (such as yttrium oxide, $Y_2O_3$) is added to the inorganic mixture in an amount generally from about 0.1 percent to about 10 percent by weight of the mixture or in the alternative in an amount sufficient to provide the amount of the grain boundary phase for the porous ceramic composition previously described. Preferably the amount of the compound is at least about 0.1, more preferably at least about 0.5, and most preferably at least about 1.0 to preferably at most about 10, more preferably at most about 4, and most preferably at about 2.0 percent by weight of the mixture. If a rare earth compound is desired, the total amount of the rare earth and yttrium compound is the same as just described with the caveat that the amount of the yttrium compound yields an amount in the grain boundary phase as described above.

The mixture may be made by any suitable method such as those known in the art. Examples include ball milling ribbon blending, vertical screw mixing, V-blending, jet milling, and attrition milling. The mixture may be prepared dry (i.e., in the absence of a liquid medium) or wet using any suitable liquid such as water or alcohol.

The mixture is then shaped into a porous shape by any suitable method, such as those known in the art. Examples include injection molding, extrusion, isostatic pressing, slip casting, roll compaction and tape casting. Each of these is described in more detail in *Introduction to the Principles of Ceramic Processing*, J. Reed, Chapters 20 and 21, Wiley Interscience, 1988.

The shaped porous body is then heated under a suitable atmosphere to form the desired porous ceramic composition such as those known for sintering the exemplary ceramics described above. Generally such sintering temperatures range from 1000° C. to 2400° C.

In a particular embodiment when forming the grain boundary phase, wherein it is essentially amorphous (less than or equal to 5% by volume crystalline to no crystalline phase in the grain boundary phase), the body is cooled through the glass transition temperature at such a rate to preclude phase separation of the yttrium containing glass. This temperature for oxide glasses of pertinence herein generally is within the temperature range of 600° C. to 1600° C. and typically is between 800 to 1500° C. The cooling rate generally coincides with the rate being at least 6° C./min and preferably the rate is at least 7, 8, 9, 10 or even 15° C./min to a rate that does not crack the part (e.g., 100° C./min).

As an illustration acicular mullite may be formed by heating under an atmosphere containing fluorine to a temperature sufficient to form said mullite composition. Fluorine may be provided in the gaseous atmosphere from sources such as $SiF_4$, $AlF_3$, HF, $Na_2SiF_6$, NaF, $NH_4F$, and fluorocarbons such as polytetrafluorethylene. Preferably, the source of fluorine is from $SiF_4$. Preferably the fluorine is separately provided. "Separately provided" means that the fluorine containing gas is supplied not from the compounds in the mixture (e.g., $AlF_3$), but from an external gas source pumped into the furnace heating the mixture. This gas preferably is a gas containing $SiF_4$.

Generally in the illustrative method, the acicular mullite porous composition is heated to a first temperature for a time sufficient to convert the precursor compounds in the porous body to fluorotopaz and then raised to a second temperature sufficient to form the mullite composition. The temperature may also be cycled between the first and second temperature to ensure complete mullite formation. The first temperature may be from about 500° C. to about 950° C. Preferably, the first temperature is at least about 550° C., more preferably at least about 650° C. and most preferably at least about 700° C. to preferably at most about 900° C., more preferably at most about 700° C. and most preferably at most about 900° C.

The second temperature may be any temperature suitable depending on variables such as the partial pressure of $SiF_4$. Generally, the second temperature is at least about 960° C. to at most about 1700° C. Preferably, the second temperature is at least about 1050° C., more preferably at least about 1075° C. and most preferably at least about 1100° C. to preferably at most about 1600° C., more preferably at most about 1400° C. and most preferably at most about 1200° C.

Generally, during the heating to the first temperature, the atmosphere is inert (e.g., nitrogen) or a vacuum until at least about 500° C., which is when a separately provided fluorine containing gas is desirably introduced. During heating to the first temperature, organic compounds and water may be removed. These may also be removed in a separate heating step common in the art described in *Introduction to the Principles of Ceramic Processing*, J. Reed, Wiley Interscience, 1988. This separate heating step is commonly referred to as binder burnout.

After cooling and forming the illustrative porous acicular mullite composition, said mullite composition maybe further heat treated to complete the formation of acicular mullite, remove residual fluorine, and establish the final grain boundary phase and composition. This heat treatment may be carried out in air, water vapor, oxygen, an inert gas or mixture thereof for a time sufficient to form the mullite composition. Examples of inert gases include nitrogen and the noble gases (i.e., He, Ar, Ne, Kr, Xe, and Rn). Preferably, the heat treatment atmosphere is an inert gas, air, water vapor or mixture thereof. More preferably, the heat treatment atmosphere is nitrogen, air or air containing water vapor. The cooling rate is desirably a rate as previously described to ensure the formation of a chemically uniform amorphous grain boundary phase.

The time at the heat treatment temperature is a function of the heat treatment atmosphere, particular illustrative mullite composition and temperature selected. For example, a heat treatment in wet air (air saturated with water vapor at about 40° C.) generally requires more than several hours to 48 hours at 1000° C. In contrast, ambient air, dry air or nitrogen (air having a relative humidity from about 20 percent to 80 percent at room temperature) desirably is heated to 1400° C. for at least about 2 hours.

Generally, the time at the heat treatment temperature is at least about 0.5 hour and is dependent on the temperature used (i.e., generally, the higher the temperature, the shorter the time may be). Preferably, the time at the heat treatment temperature is at least about 1 hour, more preferably at least about 2 hours, even more preferably at least about 4 hours and most preferably at least about 8 hours to preferably at most about 4 days, more preferably at most about 3 days, even more preferably at most about 2.5 days and most preferably at most about 2 days.

The porous ceramic composition and in particular the illustrative acicular mullite composition may be particularly useful as a support for a catalyst, such as precious metal catalyst on alumina containing washcoat particles, typically referred to as a catalyst wash coat, used in automotive catalytic converters or particulate traps. It is also preferred that the wash coat makes a thin coating on at least a portion of the ceramic grains and invariably contact the grain boundary phase of the composition. A portion is generally when at least about 5 percent of the area of the grains of one region are covered by the catalyst coating. Preferably, substantially all of the grains of one region are coated. More preferably, substantially all of the grains of the composition are coated.

Thin coating means that the catalyst wash coating has a thickness generally less than the average smallest dimension of the grains coated. Generally, the thickness of the coating is at most about half the thickness, preferably at most about one third and most preferably at most about one quarter the thickness of the average smallest dimension of the grains coated.

The composition may also be particularly useful as a particulate (soot) trap and oxidation (i.e., exhaust) catalyst for mobile power applications (e.g., diesel engines) and stationary power applications (e.g., power plants). The composition, when used as a diesel particulate trap, may have at least a portion of the mullite grains coated with a catalyst, as described above. Of course, the composition may be useful as soot trap itself without any catalyst.

EXAMPLES

Example 1

74.65 parts by weight (pbw) of CKA10 kappa alumina (available from Ceramiques Technique et Industrielles (CTI), Salindres, France) 23.37 pbw of Min-u-sil 5 silica (available from U.S. Silica Company, Berkley Springs, West Virgina, U.S.A.); 1.98 pbw of yttria (American Elements, Merelex Corporation, Los Angelos, Calif. U.S.A.); 5.25 pbw of A4M METHOCEL™ cellulose ether (available from The Dow Chemical Company, Midland, Mich.); and 16.5 pbw of A625 graphite powder (Cummings-Moore Corporation, Detroit, Mich., U.S.A) was mixed in a small high speed grinder/mixer for 1 minute to blend all the dry components uniformly to form a dry mixture. The metal impurities of the alumina, silica and yttria are shown in Table 1. The mixture had an amount of other metals (i.e., alkali, alkaline earth, and transition metals describe above) of less than about 0.2% by weight of the mixture.

58.5 pbw of water was added to the dry mixture in small increments with mixing until the mixture was a homogeneous paste. This paste was then placed in an extruder and a ribbon of paste was extruded using a ribbon (rectangular) die with a 1.5 mm×1.5 cm opening. The ribbon was cut to ~7 cm long small bars and allowed to air dry over night in air and then placed in an oven at a temperature of 100° C. for several hours to completely remove all the water from the bars.

The dried bars were then placed in a kiln and fired to 1000° C. (calcination temperature) in air and held for 2 hrs at that temperature to remove all the organic materials and form a slightly sintered (calcined) ceramic comprised of the alumina, silica and yttria. The slightly sintered ceramic had an Al:Si mole ratio of 3.75:1 and a yttria content of 2 weight percent.

The calcined bars were then placed in a controlled atmosphere sealed autoclave. The atmosphere in the autoclave was pumped out and refilled with inert gas ($N_2$) 3 times and then finally pumped out to a vacuum of less than 1 torr. The autoclave was heated to 700° C. set point and $SiF_4$ gas was introduced to the autoclave at a rate such that the exothermic reaction in the conversion of alumina and silica to the crystalline form of fluorotopaz was kept at less than 750° C. Excess $SiF_4$ gas was added to the autoclave as the temperature was stabilized at the set point of 700° C. and the autoclave was held for 16 hrs at these conditions.

The autoclave was then heated to 1250° C. and the pressure was maintained at 150 torr during the heat up by means of a controlled pump out of $SiF_4$ gas and a pressure controller for that set point. The fluorotopaz was then converted to acicular mullite (ACM) at ~1050-1060° C. with release of $SiF_4$ during the transition. The autoclave was then purged again to an inert atmosphere and slowly cooled to room temperature.

The bars were removed from the autoclave and placed in kiln and heated slowly to 1490 C and held for 6 hrs. Then the kiln was cooled at a cooling rate of 2.5° C./min between 1490° C. to 700° C., which was through the glass transition temperature of about 850° C. These final bars were removed and the strength determined as described below. The bars had a crystalline grain boundary phase, wherein the grain boundary had an amount crystalline grain boundary phase of more than 50% by volume of the grain boundary phase.

10 final bars were used to determine the initial strength (i.e., not subject to any further treatments "untreated bars"). 10 bars were wash coated with colloidal gamma alumina (AL20SD Nyacol Nano Technologies Inc., Ashland, Mass., U.S.A.) and placed in a furnace and dried at 500° C. These bars were then placed in an autoclave furnace and heated to 860° C. in the presence of 10% by volume water which was pumped in to the furnace continuously to maintain the moisture in the atmosphere of the furnace. These conditions were held for 100 hrs and then the furnace was cooled and these "treated" bars removed.

The untreated bars and the treated bars were then subjected to a 4 point bend test according to ASTM method C1161. The average of MOR for the 10 untreated and treated bars is shown in Table 2 as well as the % change in strength of the treated bars compared to the untreated bars. The grain boundary of the bars of this Example had an amount of other metals that was essentially not detectable by EDS.

Examples 2-4

Bars were made and tested in the same way as in Example 1, except that the amounts used to form the dry mixture and water used to make the paste are shown in Table 2. In addition the particular temperatures and pressures used to make the mullite are also shown in Table 2 as well as the strength of the treated and untreated bars. The bars of these Examples also had a crystalline grain boundary phase as described for Example 1. Each of these Examples had an amount of other metals in the grain boundary phase in the amount below the EDS detection limit as described in Example 1.

Examples 5-8

Honeycomb parts were made for these examples using large commercial scale paste mixing and extrusion equipment but using essentially the same procedure as described in Example 1. In these examples 3 inch×3 inch×10 inch long honeycomb parts were extruded through a 300 micron slot, 200 cpsi die and then these parts were dried in a tunnel microwave drier to remove all the water.

These dried honeycomb parts were then placed in a kiln and fired to 1065° C. and held for 2 hrs at that temperature to burn out all the organic materials and leave a slightly sintered composite of the inorganic components in the shape of a calcined honeycomb.

These calcined honeycombs were then treated in the same manner as described in Example 1 using the conditions described for each in Table 2 to form acicular mullite honeycombs. These honeycombs were removed from the autoclave and placed in kiln and heated slowly to 1490° C. and held for 6 hrs. Then the kiln was cooled at a cooling rate of 2.5 or 10° C./min (as described in Table 2) between 1490° C. to 700° C., which was through the glass transition temperature of about 850° C. These final honeycomb parts were removed and cut in to test bar pieces of 2 cells×5 cells×50 mm as described in ASTM method C1161. The material in these honeycombs had an amorphous grain boundary phase, wherein the grain boundary had an amount crystalline grain boundary phase of less than 5% by volume of the grain boundary phase and was uniform or non-uniform depending on the cooling rate as shown in Table 2. Each of these Examples had an amount of other metals in the grain boundary phase in the amount below the EDS detection limit as described in Example 1.

The test bars pieces that were cut from these honeycombs were then tested in the same manner as described in Example 1 and the results are shown in Table 2.

Comparative Example 1

A dry mixture of 70.3 parts by weight (pbw) of kappa alumina and 27.7 pbw of Min-u-sil 5 silica was prepared with 0.99 pbw of magnesium oxide and 0.99 pbw of iron oxide powder, 7.0 pbw of Dow Methocel (A4M) and 22 pbw of graphite powder (Cummings Moore A625) in same manner as Example 1. 45 pbw of water were added to the mixer in small increments with mixing until the mixture was homogeneous. The paste was then extruded and dried bars prepared in the same manner as in Example 1.

These dried bars were then placed in a kiln and fired to 1065° C. and held for 2 hrs at that temperature to burn out all the organic materials and leave a slightly sintered composite (calcined bars) of the inorganic components of alumina, silica having an Al:Si mole ratio of 2.95:1 and 1 wt % each of the MgO and $Fe_2O_3$ in the calcined bars.

The bars were then treated in the same manner as Example 1 to form the final bars and these were treated in the same manner as Example 1 to determine the strength.

The results are shown in Table 3. The grain boundary phase was amorphous and chemically uniform. The amount of other metals in the grain boundary phase was greater than 5% by weight of the grain boundary phase as measured by EDS.

Comparative Examples 2-7

Dried bars were made in the same manner as in Example 1, except that the components used to make the dried bars are shown in Table 3. The dried bars were calcined in the same manner as in Comparative Example 1. The calcined bars were formed into final bars in the same manner as in Example 1. The final bars strength untreated and treated was determined in the same manner as in Example 1, with the results shown in Table 3. The grain boundary phase for each of these Comparative Examples is shown in Table 3. The amount of other metals in the grain boundary phase for each of these Comparative Examples is also shown Table 3.

The results in Table 2 and 3 show that in the absence of any metals other than those present in mullite (Comparative Example 2) even though the grain boundary phase is free of other metals, the untreated strength is too low to be useful. Likewise, in the presence of only a rare earth (Ce) as in Comparative Example 3 or other metals as in Comparative Example 4, the ability to withstand the environment encountered in an internal combustion engine's exhaust is reduced substantially. Likewise, the presence of too much of other metals as shown in Examples 5-7, even in the presence of yttrium, including rare earth metals results in lowered treated strength compared to compositions in the absence of said metals.

The results in Table 2 also show the effect of differing Al/Si ratios and rate of cooling on improving the properties of the composition to resist the corrosive environment encountered in an internal combustion engine's exhaust.

TABLE 1

Silica, Yttria, Alumina, Ball Clay Chemistry

| Additive | Total Metal Impurities (% by weight)* | Total Rare earth metal elements (% by weight) |
|---|---|---|
| Silica (Minusil5) | 0.07% | 0 |
| Kappa alumina | 0.30% | 0 |
| Yttria | None detected | 0.0015 |
| Ball Clay** | 4.5% | 0 |

*Does not include metallic elements present in mullite & rare earth metals.
**Hywite Alum (Imerys Ceramics, Roswell, GA) used in comparative examples 4 and 5.

TABLE 2

Examples

| Example | *$SiO_2$ (pbw) | **$Al_2O_3$ (pbw) | ***$Y_2O_2$ (pbw) | C# (pbw) | Methocel (pbw) | Al/Si Ratio | Y wt % | Mullite Forming $SiF_4P$ (Torr) | Cooling Rate on final heat Treatment from 1490 #C # C/min |
|---|---|---|---|---|---|---|---|---|---|
| 1 | 23.37 | 74.65 | 1.98 | 16.5 | 5.25 | 3.75 | 2 | 375 | 2.5 |
| 2 | 15.33 | 54.24 | 0.676 | 6.75 | 5.25 | 4.2 | 1 | 600 | 2.5 |
| 3 | 15.3 | 54.24 | 0.676 | 7.75 | 5.25 | 4.2 | 1 | 150 | 2.5 |
| 4 | 44.92 | 153.1 | 1.98 | 22 | 7 | 4 | 1 | 250 | 2.5 |
| 5" | 132.40 | 337.06 | 4.74 | 66.39 | 33.19 | 3 | 1 | 370 | 10 |

TABLE 2-continued

| | | | | Examples | | | | | |
|---|---|---|---|---|---|---|---|---|---|
| 6" | 79.40 | 202.15 | 2.84 | 39.82 | 17.06 | 3 | 1 | 370 | 2.5 |
| 7" | 77.02 | 196.01 | 21.38 | 39.82 | 17.06 | 3 | 4 | 250 | 2.5 |
| 8" | 128.36 | 326.68 | 18.96 | 66.36 | 33.18 | 3 | 4 | 370 | 10 |

| Example | Amorophous content of the grain boundary fillets % | Uniformity of glass of the grain boundary | Porosity % | Untreated bar strength (MPa) | Change in bar MOR after treatement % | TSF untreated bars (° C.) | TSF Treated bars (° C.) |
|---|---|---|---|---|---|---|---|
| 1 | 10% | high crystalline | 57.4 | 37.9 | −12% | 234 | 197 |
| 2 | 5% | high crystalline | 64.8 | 15.7 | 1% | 203 | 204 |
| 3 | 5% | high crystalline | 65.5 | 17.8 | −10% | 239 | 204 |
| 4 | 5% | high crystalline | 62 | 32.2 | −9% | 248 | 222 |
| 5" | 95% | uniform | 66 | 18.1 | −4% | 257 | 218 |
| 6" | 95% | non-uniform | 67 | 20.4 | −17% | 297 | 228 |
| 7" | 95% | non-uniform | 65 | 18.3 | −15% | 290 | 215 |
| 8" | 95% | uniform | 67 | 24.2 | −9% | 263 | 223 |

*Min-u-sil 6 (table 2)
**CKA 10 Kappa Alumina (table 2)
***99.99% pure Yttria (table 2)
graphite or total porogen
"honeycomb parts made at large scale

TABLE 3

| | | | | | Comparative Examples | | | | | | |
|---|---|---|---|---|---|---|---|---|---|---|---|
| Comparative Example | SiO$_2$ (pbw) | Ball Clay (pbw) | Al$_2$O$_2$ (pbw) | M$_g$O (pbw) | Fe$_2$O$_3$ (pbw) | CaO (pbw) | Y$_2$O$_3$ (pbw) | C# (pbw) | Methocel (pbw) | Cooling Rate on final heat Treatement from 1490° C. (° C./min) | Amorphous content of the grain boundary fillets (%) |
| 1 | 27.7 | 0 | 70.3 | 0.99 | 0.99 | 0 | 0 | 22 | 7 | 2.6 | 100% |
| 2 | 27.7 | 0 | 70.3 | 0 | 0 | 0 | 0 | 22 | 7 | 2.6 | 100% |
| 3 | 22.08 | 0 | 76.94 | 0 | 0 | 1.98 | 0 | 22 | 7 | 2.6 | 90% |
| 4 | 0 | 50.82 | 46 | 0.85 | 0.34 | 0 | 0 | 22 | 7 | 2.6 | 100% |
| 5" | 0 | 62.8 | 66.06 | 0 | 0 | 0 | 1.13 | 0 | 8.4 | 2.6 | 95% |
| 6" | 30.44 | 0 | 69.66 | 0 | 0 | 0.902 | 1 | 22 | 7 | 2.6 | 95% |
| 7" | 21.72 | 0 | 66.5 | 0 | 0 | 0.774 | 1 | 22 | 7 | 2.6 | 95% |

| Comparative Example | Uniformity of glass of the grain boundary | Al/Si Ratio | Metals* wt % | Mullite Forming Pressure (torr) | Porosity (%) | Untreated bar strength (MPa) | Change in bar MOR after treatment % Loss | TSF untreated bars (° C.) | TSF treated bars (° C.) |
|---|---|---|---|---|---|---|---|---|---|
| 1 | uniform | 3 | 2.40% | 150 | 61.6 | 18.42 | −28% | 285 | 167 |
| 2 | poor microstructure | 3 | 0.12% | 150 | 60 | <5.0 | NA' | NA' | NA' |
| 3 | uniform | 4 | 2.40% | 150 | 60.3 | 12.47 | −73% | 205 | 178 |
| 4 | uniform | 3 | 5.00% | 150 | 64 | 30.8 | −29% | 334 | 160 |
| 5" | non-uniform*** | 3 | 5.00% | 150 | 56.2 | 37.3 | −24% | 227 | 159 |
| 6" | non-unifrom** | 4 | 3.50% | 150 | 65.2 | 22.3 | −22% | 358 | 193 |
| 7" | non-uniform** | 3 | 3.50% | 150 | 68.9 | 13.5 | −22% | 233 | 177 |

Graphite porogen
*Metal impurities in grain boundary
**Ceo cryatalline phaee within the mostly amorphous grain boundary
***Y poor amorphous phase has seperated from Y rich amorphous phase within the grain boundary
'Not applicable

The invention claimed is:

1. A porous ceramic composition comprising ceramic grains bonded together by a grain boundary phase comprised of silicon, yttrium and oxygen, wherein the amount of alkali metals, alkaline earth metals and other transition metals not including rare earth metals is at most 2% by weight of the grain boundary phase, wherein the ceramic grains are mullite, SiC, or silicon nitride grains, and wherein the porous ceramic composition has a porosity of 40 percent to 85 percent, and the grain boundary phase is at least 1 percent and less than 15 percent of the total volume of the porous ceramic composition.

2. A porous ceramic composition comprising ceramic grains bonded together by a grain boundary phase comprised of silicon, yttrium and oxygen, wherein the amount of alkali metals, alkaline earth metals and other transition metals not including rare earth metals is at most 2% by weight of the grain boundary phase, wherein the amount of rare earth metals are at most 25% by weight of the grain boundary phase, and wherein a concentration of any Fe in the grain boundary phase is less than 0.1 weight percent and a concentration of any Mg in the grain boundary phase is less than 0.1 weight percent.

3. The composition of claim 1, wherein the grain boundary phase is a disordered phase, crystalline phase or combination thereof.

4. The composition of claim 1, wherein the grain boundary phase is also comprised of a group 13 element.

5. The composition of claim 4, wherein the group 13 element is Al.

6. The composition of claim 1, wherein the yttrium is present in the grain boundary phase in an amount of 10% to 60% by weight of the grain boundary phase.

7. The porous ceramic composition of claim 1, wherein the amount of alkali metals, alkaline earth metals and other transition metals not including rare earth metals is at most 1% by weight of the grain boundary phase.

8. A porous ceramic composition comprising ceramic grains bonded together by a grain boundary phase comprised of silicon, yttrium and oxygen, wherein the amount of alkali metals, alkaline earth metals and other transition metals not including rare earth metals is at most 2% by weight of the grain boundary phase, wherein the amount of alkali, alkaline earth metals and other transition metals is at most 0.2% by weight of the grain boundary phase.

9. The composition of claim 8, wherein the amount of alkali, alkaline earth metals, other transition metals, rare earth metals and group 13 elements is at most 0.1% by weight.

10. A porous ceramic composition comprised of ceramic grains bonded together by a grain boundary phase comprised of silicon, yttrium, and oxygen, wherein gamma alumina particles are deposited on the porous ceramic composition and contacts at least 5% of the surface area of the porous ceramic composition, wherein the porous ceramic composition retains at least 80% of its strength after being heated to 860° C. and held for 100 hours under a flowing air containing 10% by volume of water.

11. The composition of claim 10, wherein the ceramic grains are acicular mullite grains.

12. The composition of claim 10, wherein the grain boundary phase is a disordered phase, a crystalline phase or combination thereof.

13. A particulate filter comprised of the composition of claim 1.

14. A method for preparing the porous ceramic composition of claim 1, the method comprising, a) forming a mixture of one or more precursor compounds having yttrium and the elements present in mullite, wherein alkali metals, alkaline earth metals and other transition metals not including rare earth metals are present in an amount such that the porous mullite composition that is formed has a grain boundary phase comprised of yttrium having at most about 2% by weight of said metals, b) shaping the mixture into a porous green shape, c) heating the porous green shape of step (b) to a temperature for a time such the porous ceramic composition is formed, wherein said composition has a porosity from 40% to 85% and ceramic grains formed from the ceramic particulates are bonded together by said grain boundary phase comprising yttrium, and the grain boundary phase is at least 1 percent and less than 15 percent of the total volume of the porous ceramic composition.

15. The method of claim 14, wherein the ceramic grains are mullite; and wherein the ceramic grains are formed from one or more of the following precursor compounds: synthetic or high purity clay, alumina, silica, aluminum trifluoride, and fluorotopaz.

16. The method of claim 14 wherein the one or more precursor compound having yttrium is an oxide, acetate, carbonate or nitrate.

17. The method of claim 15 wherein the precursor compounds have a molar ratio of Al/Si that is 3.3 to 4.2; and wherein the alkali metals, alkaline earth metals and other transition metals not including rare earth metals are present in an amount of at most 0.5 weight percent of the mixture.

18. The method of claim 14, further comprising cooling the porous ceramic composition after step (c) at a rate of at least 6° C./min through the glass transition temperature of the grain boundary phase.

19. The method of claim 18, wherein the grain boundary phase is amorphous and is chemically uniform.

20. The method of claim 14, wherein the amount of alkali metals, alkaline earth metals and other transition metals not including rare earth metals is at most 1% by weight of the grain boundary phase.

21. A method for preparing a porous ceramic composition, the method comprising, a) forming a mixture of one or more precursor compounds having yttrium and elements present in the ceramic composition, b) shaping the mixture into a porous green shape, c) heating the porous green shape of step (b) to a temperature such that ceramic grains arising from the ceramic particulates are bonded together by a ceramic grain boundary phase containing the rare earth element and oxygen to form the porous ceramic composition;

wherein the precursor compounds include i) amorphous or crystalline silica and ii) alumina; and the ceramic grains are formed essentially from the amorphous or crystalline silica and the alumina.

* * * * *